F. B. GILBERT.
TESTING APPARATUS.
APPLICATION FILED AUG. 14, 1916.
1,282,409. Patented Oct. 22, 1918.
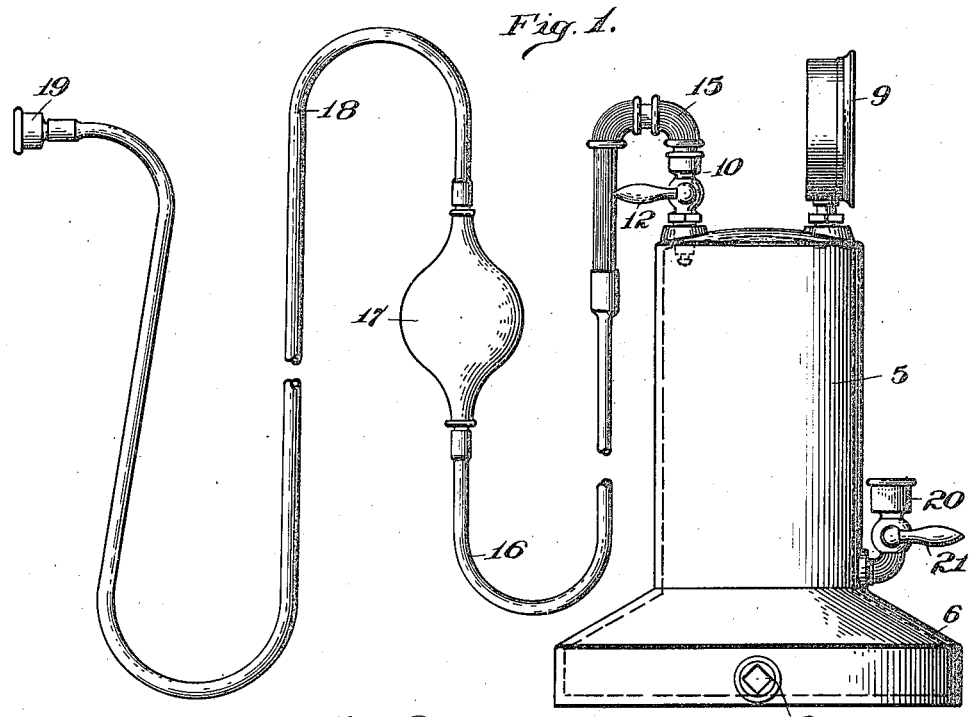
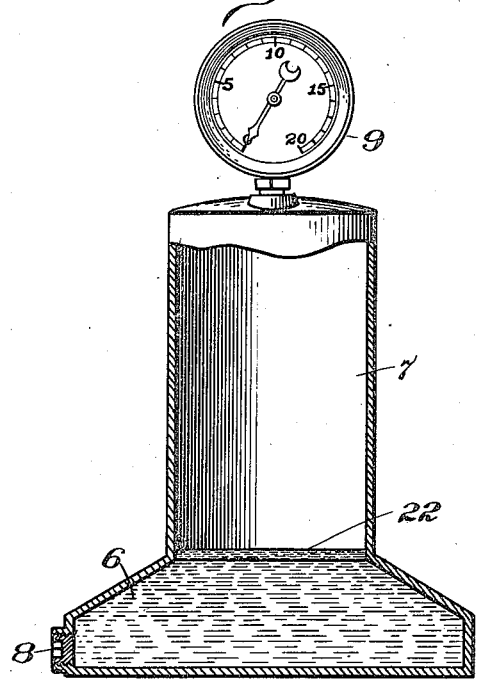
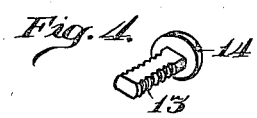
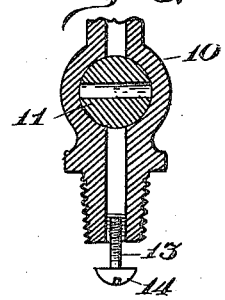
Inventor
Frank B. Gilbert,
by Adams & Jackson
Atty

UNITED STATES PATENT OFFICE.

FRANK B. GILBERT, OF CHICAGO, ILLINOIS.

TESTING APPARATUS.

1,282,409.  Specification of Letters Patent.  Patented Oct. 22, 1918.

Application filed August 14, 1916. Serial No. 114,857.

*To all whom it may concern:*

Be it known that I, FRANK B. GILBERT, a citizen of the United States; and a resident of Chicago, in the county of Cook and State of Illinois, have invented certain new and useful Improvements in Testing Apparatus, of which the following is a specification, reference being had to the accompanying drawings.

My invention relates to testing apparatus, and has particularly to do with apparatus for testing furnace flue gases for the purpose of ascertaining the percentage of some constituent element thereof, such as carbon dioxid. Such tests are frequently necessary for the purpose of determining whether or not the best results are being obtained from the combustion of the fuel, and it is important that some simple and efficacious means be provided by which the person in charge of the boiler, who is usually unskilled and incompetent to handle delicate testing apparatus, may easily and accurately make a test of the flue gases to determine the percentage of $CO_2$. To provide such an apparatus is the object of my invention. I accomplish my object as illustrated in the drawings and as hereinafter described. That which I believe to be new is set forth in the claims.

In the accompanying drawings,—

Figure 1 is a side elevation illustrating my improved apparatus;

Fig. 2 is a view of the apparatus taken at right angles to that shown in Fig. 1, the reservoir and the gas compartment being in section;

Fig. 3 is a detail, being a partial vertical section of the gas inlet; and

Fig. 4 is a perspective view showing the deflector by which the gas is distributed throughout the gas compartment in passing thereinto from the inlet.

My improved apparatus comprises a receptacle 5 having a hollow base 6 over which and communicating therewith is a gas compartment 7. The base is preferably of somewhat greater diameter than the gas compartment serving to make the apparatus stable when resting on a table or other support and serving to provide a greater volume of absorbent fluid as hereinafter described in proportion to the volume of gas being tested, whereby the effective strength of said absorbent fluid is maintained for a greater period,—the base tapering toward the bottom of the gas compartment, as shown in Figs. 1 and 2. 8 indicates a plug, which closes a drain opening in the base. 9 indicates a vacuum gage, which connects with the upper portion of the gas reservoir and in the construction shown is calibrated to read in percentage of $CO_2$, although, obviously, any suitable form of gage may be employed. The advantage of using the gage shown, however, is that it requires no expert knowledge to read it, as the pointer immediately shows the percentage of the gas under test, so that calculation is unnecessary. 10 indicates the gas inlet connection, having a valve 11 operated by a handle 12. The inlet 10 is screwed into the upper end of the gas chamber and is provided with a deflector at its inner end for the purpose of preventing the incoming gas jet from puncturing the layer of oil extending across the lower end of the compartment 7 as hereinafter described. This deflector comprises a screw-threaded shank 13 having a head 14 at its lower end, said shank being adapted to be screwed into the lower end of the inlet connection, as shown in Fig. 3. The inlet connection 10 is screw-threaded at the outer end to receive a coupling 15 to which is connected a tube 16 leading to a bulb 17, or other suitable pump, said bulb being connected by a tube 18 with a coupling 19 which may be connected to a hollow rod or tube inserted through the breeching of the furnace, or otherwise put in communication with the gases to be tested. 20 indicates an outlet cock connected with the lower portion of the gas chamber 7 and having a handle 21 for opening and closing it. It will be apparent that by opening the outlet cock 20 and operating the bulb 17 the gases to be tested can be forced into and through the gas chamber 7. In practice, this is done for a short interval, in order to expel from the gas chamber any foreign gases and insure its being filled with the gases to be tested. By then closing the outlet cock 20 and the inlet valve 11, the gas chamber will remain filled with the gases to be tested. As illustrated in Fig. 2, the reservoir 6 contains a quantity of liquid preferably admitted through the cock 20, which liquid, when a test for $CO_2$ is being made, consists preferably of a strong solution of caustic potash, which has the quality of immediately absorbing the $CO_2$ gas. 22 indicates a thin layer of oil, such as a light gravity mineral oil, which is placed in the reservoir with the caustic solution, and because of its lighter specific gravity immediately rises and floats on top thereof. This oil layer is not affected by the $CO_2$ and consequently acts as a protecting blanket to separate the gas in the gas chamber from the caustic solution and prevent the absorption of the $CO_2$ as long as the film of oil remains unbroken. In practice, the apparatus is placed on a suitable stand or support and the gas chamber filled with the gas to be tested in the manner above described. As soon as the gas chamber has been filled and the inlet and outlet passages are closed, the instrument is picked up and shaken sufficiently to break up the film of oil, to permit the gases in the gas chamber to have access to the caustic solution, whereupon the $CO_2$ is immediately absorbed, creating a partial vacuum in the gas chamber, which is immediately indicated by the gage. When the test has been completed, the unabsorbed gases may be expelled by opening the inlet and outlet and operating the bulb 17.

While this apparatus is designed primarily for use in testing for $CO_2$, it may also be used for testing for other gases, using a suitable absorbent of the gas to be tested and a suitable protecting film. In the apparatus shown and described the caustic solution may be used repeatedly without changing it except at long intervals. Any caustic solution adhering to the walls of the gas chamber does not vitiate the test to be made, as it will be neutralized before beginning the next test by pumping the gas through the gas chamber before closing the outlet cock.

So far as I am aware, I am the first in the art to provide a testing apparatus of the character described, in which a liquid absorbent is protected by a liquid film capable of being disrupted to permit the gases to have access to the absorbent. I also believe myself to be the first in the art to provide a testing apparatus comprising a chamber or other containing means of fixed cubical capacity adapted to hold a quantity of gaseous mixture to be tested and a gas absorbent, in combination with means for positively indicating the change in pressure of the gas in the containing means incident to the absorption of one constituent from the mixture. In the preferred form of my device, as shown in the drawings, the determination or measurement of the pressure in the containing means before the absorption of the desired constituent from the mixture consists merely in bringing the mixture to atmospheric pressure, but it will be understood that other means for measuring the pressure prior to the absorption of the desired constituent may be employed if desired.

That which I claim as my invention, and desire to secure by Letters Patent, is:—

1. A testing apparatus, comprising a chamber adapted to contain a gas absorbent and the gas to be tested, and means normally protecting the gas from contact with the absorbent and adapted to be temporarily rendered inoperative by agitation.

2. A testing apparatus, comprising a gas chamber, a reservoir in communication therewith adapted to contain an absorbent and the gas to be tested, and means normally protecting the gas from contact with the absorbent and adapted to be rendered temporarily inoperative by agitation.

3. A testing apparatus, comprising a chamber adapted to contain a gas absorbent and the gas to be tested, and a liquid normally protecting the gas from contact with the absorbent and adapted to be temporarily rendered inoperative by agitation.

4. A testing apparatus, comprising a gas chamber, a reservoir in communication therewith adapted to contain an absorbent and the gas to be tested, and a liquid normally protecting the gas from contact with the absorbent and adapted to be rendered temporarily inoperative by agitation.

5. A testing apparatus, comprising a chamber adapted to contain a gas absorbent and the gas to be tested, means normally protecting the gas from contact with the absorbent and adapted to be temporarily rendered inoperative by agitation, and inlet and outlet openings communicating with said chamber whereby gas may be caused to flow therethrough.

6. A testing apparatus, comprising a chamber adapted to contain a gas absorbent and the gas to be tested, means normally protecting the gas from contact with the absorbent and adapted to be temporarily rendered inoperative by agitation, a valved inlet at the upper portion of said chamber and a valved outlet at the lower portion of said chamber above the absorbent therein whereby gas may be caused to flow through said chamber and the chamber may be filled with the gas to be tested.

7. A testing apparatus, comprising a chamber, a gas absorbing liquid therein, means whereby said chamber may be filled with the gas to be tested, and means for normally keeping the gas from contact with the absorbing liquid and adapted to be temporarily rendered inoperative by agitation.

8. A testing apparatus, comprising a chamber, a gas absorbing liquid therein, means whereby said chamber may be filled with the gas to be tested, and a protecting liquid adapted to float on the surface of said absorbing liquid for normally keeping the gas from contact with the absorbing liquid.

9. A testing apparatus, comprising a chamber, a gas absorbing liquid in the lower portion thereof, a protecting liquid adapted to float on the surface of said absorbing liquid, a gas inlet at the upper portion of said chamber, a gas outlet communicating with the lower portion of said chamber above the protecting liquid therein, and means whereby said inlet and outlet may be closed.

10. A testing apparatus, comprising a chamber, a gas absorbing liquid in the lower portion thereof, a protecting liquid adapted to float on the surface of said absorbing liquid, a gas inlet at the upper portion of said chamber, a gas outlet communicating with the lower portion of said chamber above the protecting liquid therein, means whereby said inlet and outlet may be closed, and a deflector associated with said inlet.

11. A testing apparatus, comprising a chamber, a gas absorbing liquid in the lower portion thereof, a protecting liquid adapted to float on the surface of said absorbing liquid, a gas inlet at the upper portion of said chamber, a gas outlet communicating with the lower portion of said chamber above the protecting liquid therein, means whereby said inlet and outlet may be closed, and means for connecting the inlet with a source of gas supply.

12. A testing apparatus, comprising a chamber, a gas absorbing liquid in the lower portion thereof, a protecting liquid adapted to float on the surface of said absorbing liquid, a gas inlet at the upper portion of said chamber, a gas outlet communicating with the lower portion of said chamber above the protecting liquid therein, means whereby said inlet and outlet may be closed, means for connecting the inlet with a source of gas supply, and means for forcing the gas into said chamber.

13. A testing apparatus, comprising containing means of fixed cubical capacity adapted to hold a gas absorbent and a quantity of gaseous mixture to be tested, means for bringing the gaseous mixture in said containing means to atmospheric pressure, means for holding the gaseous mixture as desired out of contact with said gas absorbent, and adapted to be rendered inoperative by agitation, and a vacuum pressure gage for measuring the pressure of the gaseous mixture in said containing means after it is brought into contact with said gas absorbent, said gage being calibrated to indicate the percentage of gas absorbed based upon the reduction of pressure in said containing means from a predetermined arbitrarily-selected atmospheric pressure taken as normal.

FRANK B. GILBERT.